(12) United States Patent
Lee et al.

(10) Patent No.: US 12,230,812 B2
(45) Date of Patent: Feb. 18, 2025

(54) BUTTON CELL

(71) Applicant: SAMSUNG SDI CO., LTD., Yongin-si (KR)

(72) Inventors: Jong-Ha Lee, Yongin-si (KR); Youmee Kim, Yongin-si (KR); Byoungmin Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 63 days.

(21) Appl. No.: 16/986,731

(22) Filed: Aug. 6, 2020

(65) Prior Publication Data

US 2021/0057681 A1 Feb. 25, 2021

(30) Foreign Application Priority Data

Aug. 19, 2019 (KR) ........................ 10-2019-0101313

(51) Int. Cl.
| | |
|---|---|
| *H01M 50/109* | (2021.01) |
| *H01M 10/04* | (2006.01) |
| *H01M 50/147* | (2021.01) |
| *H01M 50/172* | (2021.01) |
| *H01M 50/40* | (2021.01) |
| *H01M 50/531* | (2021.01) |
| *H01M 50/543* | (2021.01) |

(52) U.S. Cl.
CPC ..... *H01M 50/109* (2021.01); *H01M 10/0427* (2013.01); *H01M 50/147* (2021.01); *H01M 50/172* (2021.01); *H01M 50/40* (2021.01); *H01M 50/531* (2021.01); *H01M 50/543* (2021.01)

(58) Field of Classification Search
USPC ...................................................... 429/218.1
See application file for complete search history.

(56) References Cited

U.S. PATENT DOCUMENTS

| | | | |
|---|---|---|---|
| 2,332,456 A * | 10/1943 | Mceachron | H01M 50/182 |
| | | | 429/169 |
| 6,159,630 A | 12/2000 | Wyser | |

(Continued)

FOREIGN PATENT DOCUMENTS

| | | |
|---|---|---|
| CA | 1067573 A | 12/1979 |
| CN | 1275817 A | 12/2000 |

(Continued)

OTHER PUBLICATIONS

Yang (translation) (Year: 2017).*

(Continued)

*Primary Examiner* — Matthew T Martin
*Assistant Examiner* — Paul Christian St Wyrough
(74) *Attorney, Agent, or Firm* — Lewis Roca Rothgerber Christie LLP

(57) ABSTRACT

A rechargeable battery includes: an electrode assembly including a first electrode, a second electrode, and a separator between the first electrode and the second electrode; a case having an opening and housing the electrode assembly; and a cap assembly sealing the opening of the case, and the cap assembly includes: a cap plate bonded to the case and covering the opening; a terminal plate bonded to the cap plate; and a thermal fusion member between the terminal plate and the cap plate and thermally fused with the terminal plate and the cap plate.

11 Claims, 5 Drawing Sheets

(56) References Cited

U.S. PATENT DOCUMENTS

| | | | |
|---|---|---|---|
| 6,451,473 | B1 | 9/2002 | Saito et al. |
| 7,341,802 | B1 * | 3/2008 | Ota ............... H01M 50/191 |
| | | | 429/181 |
| 2006/0269835 | A1 | 11/2006 | Song |
| 2007/0009789 | A1 * | 1/2007 | Moceri ............ H01M 10/0525 |
| | | | 29/623.2 |
| 2009/0162749 | A1 | 6/2009 | Lee |
| 2011/0300414 | A1 * | 12/2011 | Baek ............... H01M 10/425 |
| | | | 429/7 |
| 2014/0295254 | A1 | 10/2014 | Liu |
| 2017/0207491 | A1 * | 7/2017 | Tamachi ............ H01M 50/107 |
| 2017/0294635 | A1 | 10/2017 | Kim et al. |

FOREIGN PATENT DOCUMENTS

| | | |
|---|---|---|
| CN | 1901266 A | 1/2007 |
| CN | 102270752 A | 12/2011 |
| CN | 109192889 A | 1/2019 |
| EP | 0 246 590 A2 | 11/1987 |
| EP | 2 393 138 A1 | 12/2011 |
| JP | 51-114638 A | 10/1976 |
| JP | 2015-502641 A | 1/2015 |
| JP | 2017-130435 A | 7/2017 |
| KR | 10-0686859 B1 | 2/2007 |
| KR | 20090067580 A * | 6/2009 |
| KR | 101793412 B1 * | 11/2017 ......... H01M 50/531 |
| KR | 10-2018-0126928 A | 11/2018 |

OTHER PUBLICATIONS

Yang (machine translation) (Year: 2017).*
Lee (machine translation) (Year: 2009).*
Extended European Search Report for corresponding European Application No. 20191719.2, mailed Jan. 13, 2021 (7 pgs.).
European Office Action issued Mar. 23, 2023 issued in corresponding European Patent Application No. 20 191 719.2 (5 pages).
Chinese Office Action issued Nov. 2, 2023 issued in corresponding Chinese Patent Application No. 202010823973.0 (20 pages, including 11 pages of English translation).
Chinese Office Action dated May 21, 2024, issued in corresponding Chinese Patent Application No. 202010823973.0 (7 pages).

* cited by examiner

BUTTON CELL

CROSS-REFERENCE TO RELATED APPLICATION

This application claims priority to and the benefit of Korean Patent Application No. 10-2019-0101313, filed on Aug. 19, 2019 in the Korean Intellectual Property Office, the entire content of which is incorporated herein by reference.

BACKGROUND

1. Field

Aspects of embodiments of the present invention relate to a rechargeable battery.

2. Description of the Related Art

Unlike a primary battery that is incapable of being recharged, a rechargeable battery can be repeatedly charged and discharged. A low-capacity rechargeable battery may be used for small electronic devices, such as a mobile phone, a laptop computer, and a camcorder, and a large-capacity rechargeable battery has been widely used as a power source for driving a motor, such as of a hybrid vehicle.

A representative rechargeable battery may include a nickel-cadmium (Ni—Cd) battery, a nickel-hydrogen (Ni-MH) battery, a lithium (Li) battery, and a lithium ion (Li-ion) rechargeable battery. Particularly, the lithium ion rechargeable battery, or secondary battery, has a higher operation voltage than the nickel-cadmium battery or the nickel-hydrogen battery that is mainly used as a portable electric equipment power source by about three times. Also, the lithium ion secondary battery is widely used in an aspect that energy density per unit weight is high.

In particular, as a demand for wearable devices, such as headphones, earphones, smartwatches, and body-mounted medical devices which use Bluetooth has increased, the need for rechargeable batteries of which energy density is high and which have ultra-small size has been increasing.

The ultra-small rechargeable battery has important tasks of securing the required electrical capacity within a limited size, implementing an efficient structure while improving an effective low weight, and improving structural stability.

The above information disclosed in this Background section is only for enhancement of understanding of the background of the invention, and, therefore, it may contain information that does not form the prior art that is already known in this country to a person of ordinary skill in the art.

SUMMARY

According to an aspect of embodiments of the present invention, an ultra-small rechargeable battery is provided. According to another aspect of embodiments of the present invention, a rechargeable battery implementing an efficient structure, improving electrical capacity, improving low weight, and securing structural stability is provided.

According to one or more embodiments of the present invention, a rechargeable battery includes: an electrode assembly including a first electrode, a second electrode, and a separator between the first electrode and the second electrode; a case having an opening and housing the electrode assembly; and a cap assembly sealing the opening of the case, and the cap assembly includes: a cap plate bonded to the case and covering the opening; a terminal plate bonded to the cap plate; and a thermal fusion member between the terminal plate and the cap plate and thermally fused with the terminal plate and the cap plate.

In the terminal plate and the cap plate, a surface in contact with the thermal fusion member may be etched such that the thermal fusion member is bonded thereto.

The rechargeable battery may further include a first electrode tab extending from the first electrode, and a second electrode tab extending from the second electrode, the case and the cap plate may be electrically connected to the first electrode through the first electrode tab, and the terminal plate may be electrically connected to the second electrode through the second electrode tab.

The cap plate may have a terminal hole, and the terminal plate may include: a tab bonding portion facing the terminal hole and bonded with the second electrode tab; and a flange portion around the tab bonding portion and bonded with the thermal fusion member.

The thermal fusion member may have a ring shape extending along the flange portion, and seals between the flange portion and the cap plate.

The terminal plate may be at an exterior side of the cap plate such that the flange portion is exposed outside.

In the terminal plate, the tab bonding portion may extend into the terminal hole, and the second electrode tab may be welded to an inside surface of the tab bonding portion through the terminal hole.

In the electrode assembly, the first electrode, the second electrode, and the separator may be spiral-wound around a center pin, an upper surface of the electrode assembly being arranged toward the cap assembly, a lower surface of the electrode assembly being arranged toward a bottom of the case, the first electrode tab may extend from the lower surface of the electrode assembly to be welded to a bottom of the case, and the second electrode tab may extend from the upper surface of the electrode assembly to be welded to the tab bonding portion.

The terminal hole may be at a center of the cap plate, the center pin may protrude from the upper surface of the electrode assembly toward the tab bonding portion, and the second electrode tab may be supported by an upper end of the center pin and welded to the tab bonding portion.

The cap plate may be welded to a side wall end where a rim surrounds the opening of the case.

The rechargeable battery may have a ratio of a height to a diameter of 1 or less.

According to an aspect of embodiments of the present invention, the rechargeable battery may be capable of realizing the effective structure, improving low weight, improving an electrical capacity, and securing the structural stability.

DESCRIPTION OF SOME SYMBOLS

Figure 1:
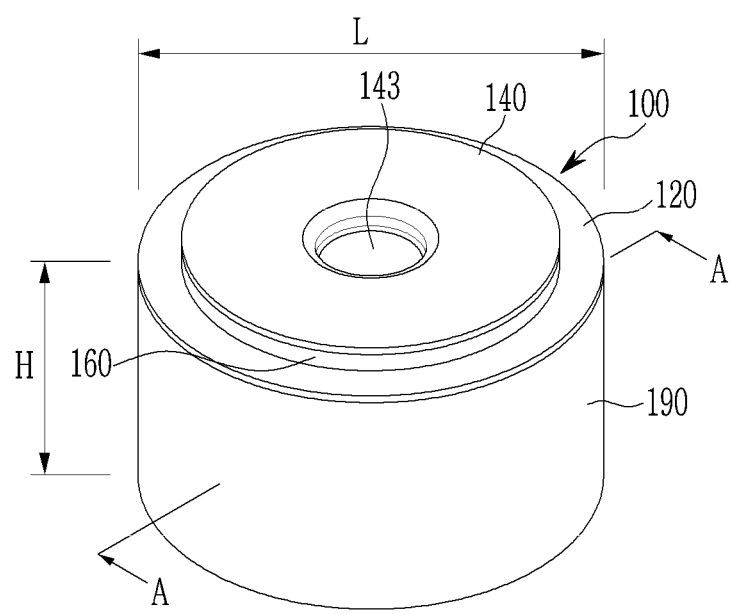
FIG. 1 is a perspective view showing a rechargeable battery according to an embodiment of the present invention.

| | |
|---|---|
| 100: cap assembly | 120: cap plate |
| 122: terminal hole | 140: terminal plate |
| 143: tab bonding portion | 145: flange portion |
| 147: bonding surface | 160: thermal fusion member |
| 190: case | 200: electrode assembly |
| 210: center pin | 232: first electrode tab |
| 234: second electrode tab | |

DETAILED DESCRIPTION

In the following detailed description, only certain example embodiments of the present invention are shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, redundant description of the same constituent elements may be omitted.

Also, in this specification, it is to be understood that when one component is referred to as being "connected" or "coupled" to another component, it may be connected or coupled directly to the other component or connected or coupled to another component with one or more other components intervening therebetween. On the other hand, in this specification, it is to be understood that when one component is referred to as being "connected or coupled directly" to another component, it may be connected or coupled to the other component without another component intervening therebetween.

It is also to be understood that the terminology used herein is only for the purpose of describing particular embodiments, and is not intended to be limiting of the invention.

Singular forms are to include plural forms unless the context clearly indicates otherwise.

It is to be further understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

Also, as used herein, the term "and/or" includes any plurality of combinations of items or any of a plurality of listed items. In this specification, "A or B" may include "A," "B," or "A and B".

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Embodiments of the present invention relate to a rechargeable battery of which the size may vary; however, in one or more embodiments, an ultra-small rechargeable battery having a very small size is provided such that it may be used for headphones, earphones, smartwatches, and wearable devices.

In addition, embodiments of the present invention may be applied to various shapes and kinds of rechargeable batteries, such as square types, cylindrical types, and pin types; however, in one or more embodiments, a coin-type or button-type battery is provided. The coin-type or button-type battery has a shape of a thin coin or button and may be used as an ultra-small battery, and may be defined as a battery of which a ratio (a height/diameter) of a height (H) to a diameter (L) of the rechargeable battery is 1 or less.

In one or more embodiments, the coin-type or button-type battery may be cylindrical having a circular cross-sectional shape, but it is not limited thereto and may have an elliptical or polygonal cross-sectional shape.

Here, as shown in FIG. 1, the diameter L refers to a maximum distance between the side surfaces of a case 190 where an electrode assembly 200 is embedded or housed, and the height H refers to a minimum distance from a flat bottom surface of the battery to a flat upper surface of the battery, and it may be understood as from the lower surface of the case 190 to the upper surface of the cap assembly 100.

Rechargeable batteries according to embodiments of the present invention may be of various sizes, types, and shapes, but for convenience of explanation of an example embodiment of the present invention, the coin-type battery of which the cross-sectional shape is circular is described as an example.

Figure 2:
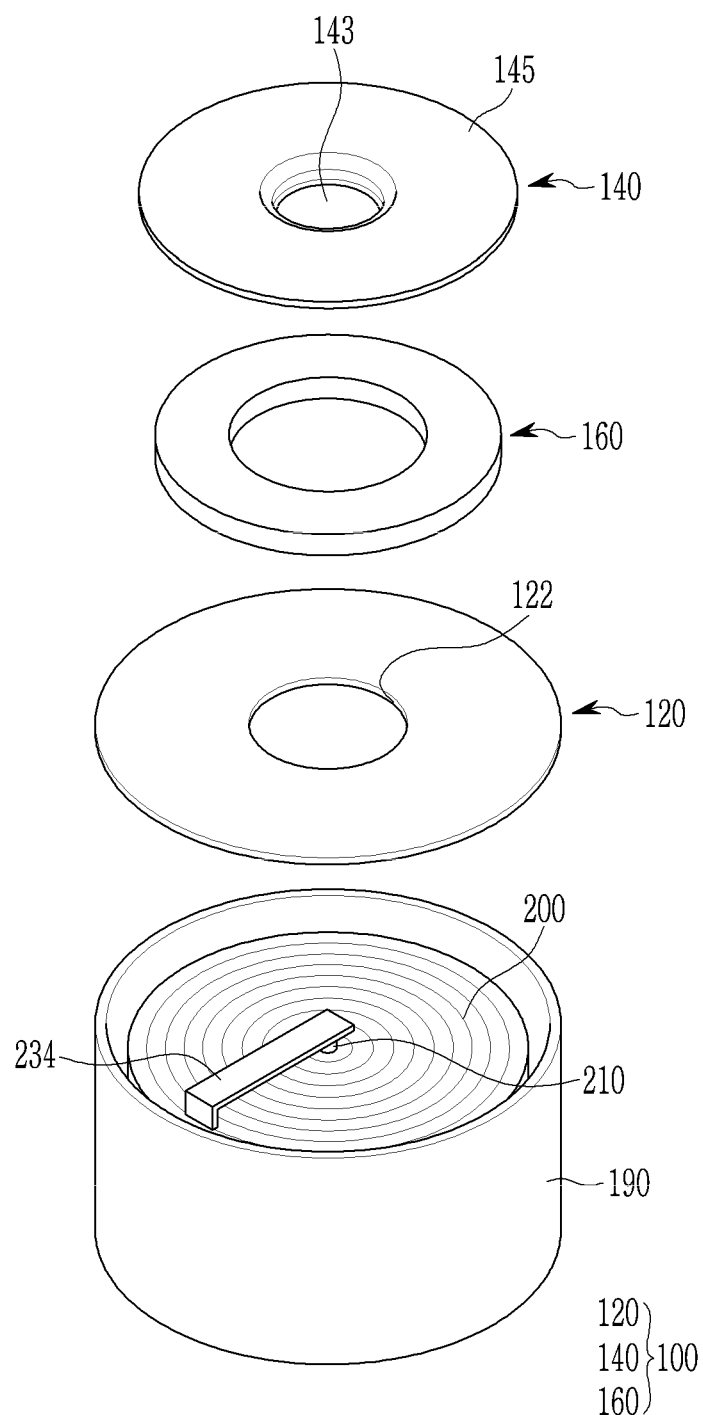
FIG. 2 is an exploded perspective view of the rechargeable battery of FIG. 1.

FIG. 1 is a perspective view showing a rechargeable battery according to an example embodiment of the present invention; FIG. 2 is an exploded perspective view of the rechargeable battery of FIG. 1; and FIG. 3 is a cross-sectional view of a rechargeable battery according to an example embodiment of the present invention.

Figure 3:
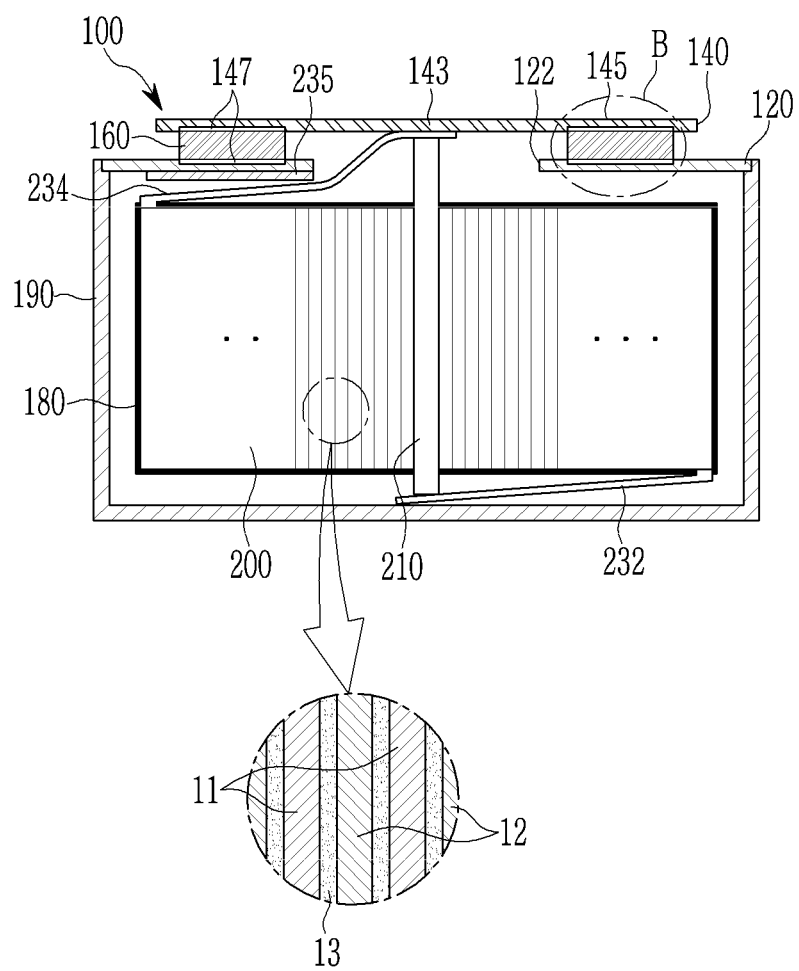
FIG. 3 is a cross-sectional view of a rechargeable battery according to another embodiment of the present invention.

As shown in FIG. 1 to FIG. 3, a rechargeable battery according to an embodiment of the present invention includes an electrode assembly 200 in which a separator 13 is interposed between a first electrode 11 and a second electrode 12, a case 190 having an opening at one side and housing the electrode assembly 200, and a cap assembly 100 bonded to the opening and closing and sealing the case 190, and the cap assembly includes a cap plate 120 bonded to the case 190 and covering the opening, a terminal plate 140 bonded on the cap plate 120, and a thermal fusion member 160 disposed between the terminal plate 140 and the cap plate 120 and thermally fused with the terminal plate 140 and the cap plate 120.

The electrode assembly 200 includes the first electrode 11 and the second electrode 12 which may have a coated region and an uncoated region. The first electrode 11 may be a positive electrode and the second electrode 12 may be a negative electrode, or vice versa. The separator 13 to provide electrical insulation may be interposed between the first electrode 11 and the second electrode 12.

In an embodiment of the present invention, the electrode assembly 200 may be provided in a stacked form, but, as shown in FIG. 2 or FIG. 3, the first electrode 11, the second electrode 12, and the separator 13 may be spiral-wound together around a center pin 210, thereby having a jelly-roll shape.

In an embodiment, when the electrode assembly 200 is a spiral-wound type, as shown in FIG. 3, the electrode assembly 200 may have a flat upper surface and a lower surface may have a curved surface, and the center pin 210 may be parallel to the height direction of the rechargeable battery. That is, for the electrode assembly 200, the upper surface may be arranged toward the cap assembly 100 and the lower surface may be arranged toward a bottom of the case 190.

As shown in FIG. 3, the rechargeable battery according to an embodiment of the present invention may include an insulating member 180 around (e.g., surrounding) the electrode assembly 200. The insulating member 180 may be formed of an electrically insulating material to provide electrical insulation between the case 190 and the electrode assembly 200.

In an embodiment, the first electrode 11 may be a negative electrode and formed in a belt shape that is elongated, and includes a negative electrode coated region as a region where a negative active material layer is coated on a current collector of a metal film (for example, a copper foil) and a negative uncoated region as a region where the active material is not coated. The negative uncoated region may be disposed at the end of a side of the negative electrode in the length direction.

In an embodiment, the second electrode 12 may be a positive electrode and formed in the belt shape that is elongated, and includes a positive electrode coated region as a region where a positive active material layer is coated on the current collector of a metal film (for example, an aluminum foil) and a positive electrode uncoated region as a region where the active material is not coated. The positive electrode uncoated region may be disposed at the end of a side of the positive electrode in the length direction.

The case 190 has an accommodation space in which the electrode assembly 200 is accommodated, and an opening may be formed at a side of the case 190. In an embodiment of the present invention, the case 190 has an opening formed at an upper surface, as shown in FIG. 2 and FIG. 3, and the electrode assembly 200 may be accommodated therein. The opening may be formed at the upper side or the bottom of the case 190, but the following description is based on the opening being formed at the upper surface of the case 190.

In an embodiment, the case 190 may be made of a metal material having electrical conductivity such as aluminum (Al) or stainless steel (SUS), and the shape of the case 190 may be varied according to a need, such as cylindrical or square, and, as an example embodiment of the present invention, FIG. 1 and FIG. 2 show the case 190 of a cylindrical shape in which the spiral-wound type electrode assembly 200 is accommodated.

As shown FIG. 1 and FIG. 3, the cap assembly 100 is bonded to the opening of the case 190, and may close and seal the accommodation space of the case 190. As the coupling method with the case 190, any of various methods such as metal-to-metal welding, plastic welding, and bonding using a tape or an adhesive may be possible.

The cap assembly 100 may include the cap plate 120, the terminal plate 140, and the thermal fusion member 160.

In an embodiment, the cap plate 120 is directly bonded to the case 190 and may be made of a metal material having electrical conductivity, such as aluminum or stainless steel, like the case 190, and, as shown in FIG. 2, it may be provided as a plate shape having a cross-section corresponding to the opening of the case 190, but it is not limited thereto, and the material and shape thereof may be varied.

The cap plate 120 is bonded to the opening of the case 190, and the coupling method may be any of various methods, and FIG. 3 shows a shape in which a circumference of the cap plate 120 is seated on a side wall of the case 190 and is mutually bonded by a manner such as welding.

The terminal plate 140 is bonded to the cap plate 120. The terminal plate 140 may be directly bonded to the cap plate 120 in an insulated state from the cap plate 120; however, in an exemplary embodiment of the present invention, as shown in FIGS. 1 to 3, it may be bonded to the cap plate 120 via the thermal fusion member 160.

In an embodiment, the terminal plate 140 may be electrically connected to any one of the first electrode and the second electrode of the electrode assembly 200, and may be electrically connected to a terminal provided in an external electronic device.

Figure 4:
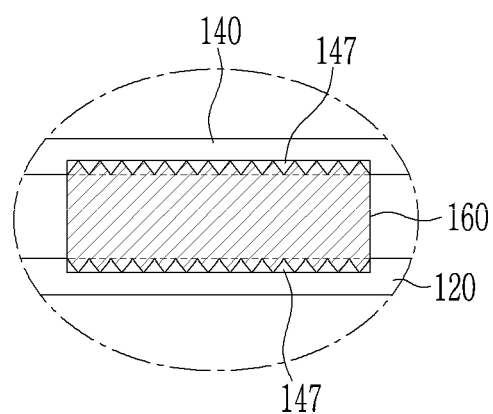
FIG. 4 is an enlarged view of a region "B" of FIG. 3.

FIG. 4 is a view enlarging a region "B" in the rechargeable battery shown in FIG. 3. The thermal fusion member 160 is disposed between the cap plate 120 and the terminal plate 140 and is thermally fused facing the cap plate 120 and the terminal plate 140. That is, the thermal fusion member 160 is a medium for mutually coupling the cap plate 120 and the terminal plate 140.

The thermal fusion member 160 may be formed of an electrically insulating material, such as a polymer, and melted using a laser or the like to be fused to the cap plate 120 and the terminal plate 140.

In an exemplary embodiment of the present invention, the terminal plate 140 is combined with the cap plate 120 through the thermal fusion member 160, thereby forming a stable bonding structure while effectively insulating the terminal plate 140 and the cap plate 120 without adding a separate insulating configuration.

In the case of the coin-type battery, it may be manufactured to be ultra-small and have a design limitation in terms of space, and, accordingly, it is desired to secure functionality while simplifying the structure and the manufacturing process, and embodiments of the present invention are effective because the insulation and the bonding between the terminal plate 140 and the cap plate 120 may be achieved together through the fusion member 160.

In an embodiment of the present invention, as shown in FIG. 3 and FIG. 4, the respective surfaces where the terminal plate 140 and the cap plate 120 are in contact with the thermal fusion member 160 are etched such that the thermal fusion member 160 may be bonded.

That is, in an embodiment of the present invention, so as to improve a bonding force of the thermal fusion member 160 melted by a laser and the cap plate 120 and the terminal plate 140 made of a metal material, a bonding surface 147 with the thermal fusion member 160 in the terminal plate 140 and the cap plate 120 may be etched.

The etching may be provided using a laser or chemicals, and the molten thermal fusion member 160 may penetrate into the etched bonding surface 147, thereby forming a stronger bonding force.

FIG. 3 schematically shows a shape of which a bonding surface 147 to which the thermal fusion member 160 is bonded in the terminal plate 140 and the cap plate 120 is etched according to an embodiment of the present invention;

and FIG. 4 schematically shows that the bonding force is increased due to the penetration of the thermal fusion member 160 on the etched bonding surface 147.

In an embodiment, the bonding surface 147 of the terminal plate 140 and the cap plate 120 may be coated with a metal, such as chromium, and corrosion resistance of the etched bonding surface 147 may be improved through this chromizing process.

In an embodiment of the present invention, a first electrode tab 232 extends from the first electrode 11 and a second electrode tab 234 extends from the second electrode 12, and the case 190 and the cap plate 120 may be electrically connected to the first electrode 11 through the first electrode tab 232, while the terminal plate 140 may be electrically connected to the second electrode 12 through the second electrode tab 234.

The first electrode tab 232 extends from the first electrode 11 of the electrode assembly 200 and may be bonded to the case 190 or the cap plate 120. FIG. 3 shows a shape in which the first electrode tab 232 is bonded to the bottom of the case 190 according to an embodiment of the present invention, but embodiments are not limited thereto.

The first electrode tab 232 may be made of a metal material having electrical conductivity and may be integrally provided with the first electrode 11 or separately manufactured to be bonded to the first electrode 11 by welding, etc., and is electrically connected to the first electrode 11, thereby having the same polarity.

In an embodiment, the case 190, which is bonded and electrically connected to the first electrode tab 232, may have the same polarity as the first electrode 11, and the cap plate 120, which is bonded to the case 190 by welding, has the same polarity as the first electrode 11 along with the case 190.

The second electrode tab 234 may extend from the second electrode 12 of the electrode assembly 200 to be bonded to the terminal plate 140. The second electrode tab 234 may be integrally provided with the second electrode 12 or separately manufactured to be bonded to the second electrode 12 by welding, etc.

The second electrode tab 234 may be made of a metal material having electrical conductivity and may be electrically connected to the second electrode 12, thereby having the same polarity. In addition, the terminal plate 140, which is electrically connected to the second electrode tab 234, may have the same polarity as the second electrode 12.

The second electrode tab 234 and the terminal plate 140 may have a mutual coupling relationship using a separate media, or may be directly bonded to each other by a method such as welding, as shown in FIG. 3.

Referring to FIG. 3, in an embodiment, the first electrode tab 232 and the second electrode tab 234 may require electrical insulation with the case 190, etc., and may be used in a form of which an electrically insulating material is coated on a surface for the electrical insulation with the case 190.

In an embodiment, an insulating film 235 may be disposed between the cap plate 120 and the second electrode tab 234 such that the electrical insulation is provided between the cap plate 120 and the second electrode tab 234 bonded with the terminal plate 140.

In an embodiment, the insulating film 235 may be provided on an entire inside surface of the cap plate 120, and, in an embodiment, as shown in FIG. 3, the insulating film 235 may be provided on one side facing the second electrode tab 234.

Since the cap plate 120 electrically connected to the first electrode 11 through the first electrode tab 232 and the terminal plate 140 electrically connected to the second electrode 12 through the second electrode tab 234 have different polarities from each other, in order to prevent or substantially prevent a short circuit, the electrical insulation of each is provided, and, in an exemplary embodiment of the present invention, the electrical insulation between the terminal plate 140 and the cap plate 120 may be achieved through the thermal fusion member 160.

In an embodiment of the present invention, a terminal hole 122 is formed in the cap plate 120, and the terminal plate 140 may include a tab bonding portion 143 disposed to face the terminal hole 122 and bonded with the second electrode tab 234, and a flange portion 145 around (e.g., enclosing) the tab bonding portion 143 and bonded with the thermal fusion member 160.

The terminal hole 122 in the cap plate 120 may be formed in any of various sizes and shapes. The terminal plate 140 may have a larger diameter than the terminal hole 122, and may include the tab bonding portion 143 facing the terminal hole 122 and the flange portion 145 around (e.g., surrounding) the tab bonding portion 143.

The second electrode tab 234 may be bonded to the tab bonding portion 143. In an embodiment, for example, when the terminal plate 140 is disposed on the inside surface of the cap plate 120, the second electrode tab 234 may be welded to the tab bonding portion 143 by performing laser welding through the terminal hole 122, and when the terminal plate 140 is disposed on the exterior side of 120, the second electrode tab 234 may contact and be welded to the tab bonding portion 143 through the terminal hole 122.

In an embodiment, the flange portion 145 may have the bonding surface 147 surrounding the tab bonding portion 143 and contacting the thermal fusion member 160. That is, in the terminal plate 140, the tab bonding portion 143 of the center may be bonded to the second electrode tab 234, and the flange portion 145 of the circumference side may be bonded with the thermal fusion member 160.

In the case of the coin-type battery of the ultra-small size, the size is small, such that there may be a spatial limitation in design; however even if there may be the spatial limitation as described above, in an embodiment of the present invention, as shown in FIG. 3, by separately setting the tab bonding portion 143 and the flange portion 145 in the terminal plate 140, a structure in which the combination between the terminal plate 140 and the cap plate 120 and the combination between the terminal plate 140 and the second electrode tab 234 are concurrently (e.g., simultaneously) possible may be effectively realized.

In an embodiment, the thermal fusion member 160, as shown in FIG. 2, has a ring shape extending along the flange portion 145 and seals between the flange portion 145 and the cap plate 120. Due to the formation of the terminal hole 122, a space between the terminal plate 140 and the cap plate 120 may communicate with an internal space of the case 190, and, accordingly, a sealing structure for sealing the interior of the case 190 may be required.

In an embodiment of the present invention, as the thermal fusion member 160 has the ring shape to correspond to the flange portion 145 enclosing the tab bonding portion 143 and is disposed between the flange portion 145 and the cap plate 120, the terminal hole 122 may be formed in the cap plate 120 and the terminal plate 140 may be bonded to the cap plate 120, and concurrently (e.g., simultaneously) the stable sealing structure may be formed.

In an embodiment, as shown in FIGS. 1 to 3, the terminal plate 140 is disposed on the exterior side of the cap plate 120 such that the flange portion 145 may be exposed outside.

That is, the terminal plate 140 is disposed on the exterior side corresponding to the opposite side of the inside surface toward the electrode assembly 200 from the cap plate 120 and is exposed outside. In this case, as shown in FIG. 3, the tab bonding portion 143 and the second electrode tab 234 may be bonded to each other through the terminal hole 122, and the flange portion 145 may have the structure surrounding a periphery of the tab bonding portion 143.

The tab bonding portion 143 may have a shape and size corresponding to the terminal hole 122 and the flange portion 145 encloses the circumference of the tab bonding portion 143, thereby having a diameter that is larger than the terminal hole 122.

For the terminal plate 140 exposed to the outside, the flange portion 145 may also function as a terminal as well as the tab bonding portion 143. For example, when the rechargeable battery according to an embodiment of the present invention is inserted into an external electronic device, even if the terminal of the external electronic device is spaced from the tab bonding portion 143 to which the second electrode tab 234 is bonded, the terminal of the external electronic device may be in contact with the flange portion 145 of the terminal plate 140, thereby easily using the rechargeable battery.

That is, as an embodiment of the present invention disposes the terminal plate 140 including the flange portion 145 at the outside of the cap plate 120, it is possible to increase a contact area with a terminal of the external electronic device on the terminal plate 140, thereby being advantageous in terms of design.

Further, in the case of ultra-small rechargeable batteries requiring precision in terms of design, for example, ultra-small coin-type batteries as described above, design precision may be required in relation to the external electronic devices, such as the terminal positions, and an embodiment of the present invention exposes the flange portion 145 outside, thereby being advantageous in increasing the contact area with the terminal.

Figure 5:
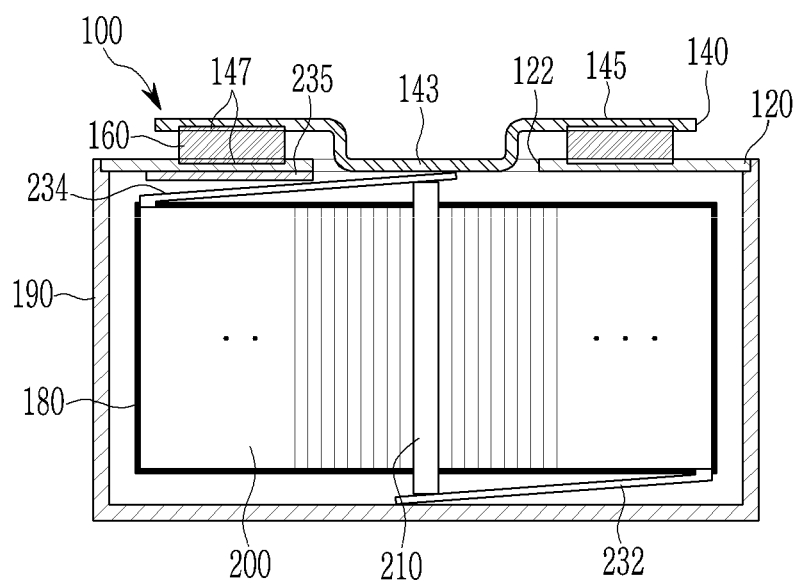
FIG. 5 is a cross-sectional view of a rechargeable battery, taken along the line A-A of FIG. 1, according to an embodiment of the present invention.

In an embodiment, unlike the rechargeable battery shown in FIG. 1, in the rechargeable battery of FIG. 3, the tab bonding portion 143 of the terminal plate 140 is disposed parallel to the flange portion 145, and FIG. 5 shows a cross-section of the rechargeable battery of FIG. 1, taken along the line A-A, and shows a structure in which the tab bonding portion 143 of the terminal plate 140 is indented toward the terminal hole 122 side with respect to the flange portion 145.

Referring to FIG. 1 and FIG. 5, in an embodiment of the present invention, in the terminal plate 140, the tab bonding portion 143 may be inserted into the terminal hole 122 side, and the second electrode tab 234 may be welded to the inside surface of the tab bonding portion 143 through the terminal hole 122.

Referring to FIG. 5, the tab bonding portion 143 disposed at a center side of the terminal plate 140 may have a shape that is recessed downward relative to the surrounding flange portion 145. Accordingly, it is advantageous that a distance between the lower surface of the tab bonding portion 143 and the second electrode tab 234 may be reduced, effective welding using a laser may be performed, and the laser welding for the second electrode tab 234 may be performed even if the bonding between the case 190 and the cap plate 120 is preceded.

In an embodiment, in the electrode assembly 200, the first electrode 11, the second electrode 12, and the separator 13 may be spiral-wound around the center pin 210, an upper surface of the electrode assembly 200 may be arranged toward the cap assembly 100, a lower surface of the electrode assembly 200 may be arranged toward the case 190, the first electrode tab 232 may extend from the lower surface of the electrode assembly 200 to be welded to the bottom of the case 190, and the second electrode tab 234 may extend from the upper surface of the electrode assembly 200 to be welded to the tab bonding portion 143.

FIG. 2, FIG. 3, and FIG. 5 show the spiral-winding-type electrode assembly 200 in which the first electrode 11, the second electrode 12, and the separator 13 are spiral-wound around the center pin 210 corresponding to a winding shaft as an embodiment of the present invention. Referring to FIGS. 2 and 3, the upper surface of the electrode assembly 200 may be arranged toward the cap assembly 100, and the lower surface of the electrode assembly 200 may be arranged toward the bottom of the case 190.

As described above, by using the spiral-winding type of electrode assembly 200 of the state that the center pin 210 extends upward and downward, the energy density may be improved by effectively utilizing the accommodation space of the case 190, and, further, it may be effective in realizing the flat and thin rechargeable battery such as the coin-type battery.

In an embodiment, the first electrode tab 232, as shown in FIG. 5, may extend from the lower surface of the electrode assembly 200, and, accordingly it may extend and be welded to the bottom of the case 190 facing the lower surface of the electrode assembly 200 along a simple and effective path.

Also, the second electrode tab 234 may extend from the upper surface of the electrode assembly 200, as shown in FIG. 5, and may reduce the distance with the tab bonding portion 143 and extend along a simple and effective path to be welded to the tab bonding portion 143.

In an embodiment, the terminal hole 122 may be disposed in the center of the cap plate 120, the center pin 210 may be protruded from the upper surface of the electrode assembly 200 toward the tab bonding portion 143, and the second electrode tab 234 may be supported by the upper end of the center pin 210 and welded to the tab bonding portion 143.

In an embodiment of the present invention, as the terminal hole 122 may be disposed at the center side of the cap plate 120, it is easy for the second electrode tab 234 supported by the center pin 210 to face the tab bonding portion 143.

Also, in an embodiment of the present invention, the electrode assembly 200 may include the center pin 210 at the center, and the center pin 210 may be made of any of various materials having electrical insulation. In the center pin 210, the upper end arranged toward the cap assembly 100 may be protruded more toward the tab bonding portion 143 than the upper surface of the electrode assembly 200.

The second electrode tab 234 is supported by the upper end of the center pin 210, and may be in contact with the tab bonding portion 143 of the terminal plate 140.

That is, in an embodiment of the present invention, the tab bonding portion 143 has a shape that is inserted into the terminal hole 122 side in relation to the flange portion 145, and the center pin 210 is protruded from the upper surface of the electrode assembly 200 to support the second electrode tab 234, thereby stably establishing the contact between the second electrode tab 234 and the tab bonding portion 143.

Therefore, the second electrode tab 234 may be effectively combined with the tab bonding portion 143 through laser welding from the outside, even before and after the coupling between the case 190 and the cap assembly 100.

As shown in FIGS. 1 to 3, in the rechargeable battery according to an embodiment of the present invention, the cap plate 120 may be welded to a side wall end where a rim surrounds the opening of the case 190.

In an embodiment, as shown in FIG. 3 and FIG. 5, the side wall surrounding the opening of the case 190 may include a seating groove for seating the rim of the cap plate 120 at the end, and the seating groove may be provided to be toward the inner space of the case 190 on the side wall.

Accordingly, the cap plate 120 may be seated on the side wall of the case 190 at the rim, and the welding may be performed while the rim of the cap plate 120 is seated in the seating groove.

The rechargeable battery according to one or more embodiments of the present invention may have the coin shape of which the ratio of the height H to the diameter L is 1 or less.

That is, in one or more embodiments of the present invention, the coin-type battery may be understood as the battery of the flat and thin shape having the ratio of the height H to the diameter L of 1 or less, and the coin-type battery may realize the ultra-small size.

That is, embodiments of the present invention may be applied to the ultra-small coin-type battery of the very small size, and, even in a rechargeable battery of a small size, the bonding and the insulation between the terminal plate 140 and the cap plate 120 may be concurrently (e.g., simultaneously) realized through the thermal fusion member 160, and the bonding between the tab bonding portion 143 and the second electrode tab 234 may be easily performed.

While the present invention has been described in connection with what are presently considered to be some practical embodiments, it is to be understood that the invention is not limited to the disclosed embodiments. On the contrary, it is intended to cover various modifications and equivalent arrangements included within the spirit and scope of the appended claims.

What is claimed is:

1. A button cell comprising:
an electrode assembly comprising a first electrode, a second electrode, and a separator between the first electrode and the second electrode;
a case having an opening and housing the electrode assembly, the opening being located at a top of the case that is opposite a bottom of the case along a first direction;
a cap assembly sealing the opening of the case; and
a second electrode tab extending from the second electrode,
wherein the cap assembly comprises:
a cap plate bonded to the case and covering the opening, the cap plate having a terminal hole;
a terminal plate bonded to the cap plate; and
a thermal fusion member between the terminal plate and the cap plate and thermally fused with the terminal plate and the cap plate,
wherein, along the first direction, an uppermost surface of the terminal plate is located at a height greater than an uppermost surface of the thermal fusion member,
the terminal plate is electrically connected to the second electrode through the second electrode tab, the terminal plate and the second electrode tab are connected through the terminal hole, and the thermal fusion member is entirely on an upper surface of the cap plate facing in the first direction and is entirely outside the terminal hole in a second direction crossing the first direction so as not to overlap the terminal hole in the first direction, and
the terminal plate completely covers the thermal fusion member in the first direction.

2. The button cell of claim 1, wherein, in the terminal plate and the cap plate, a surface in contact with the thermal fusion member is etched such that the thermal fusion member is bonded thereto.

3. The button cell of claim 1, further comprising:
a first electrode tab extending from the first electrode,
wherein the case and the cap plate are electrically connected to the first electrode through the first electrode tab.

4. The button cell of claim 3, wherein
the terminal plate comprises:
a tab bonding portion facing the terminal hole and bonded with the second electrode tab; and
a flange portion around the tab bonding portion and bonded with the thermal fusion member.

5. The button cell of claim 4, wherein the thermal fusion member has a ring shape extending along the flange portion and seals between the flange portion and the cap plate.

6. The button cell of claim 4, wherein the terminal plate is at an exterior side of the cap plate such that the flange portion is exposed outside.

7. The button cell of claim 6, wherein
in the terminal plate, the tab bonding portion extends into the terminal hole, and
the second electrode tab is welded to an inside surface of the tab bonding portion through the terminal hole.

8. The button cell of claim 7, wherein
in the electrode assembly, the first electrode, the second electrode, and the separator are spiral-wound around a center pin, an upper surface of the electrode assembly being arranged toward the cap assembly, a lower surface of the electrode assembly being arranged toward the bottom of the case,
the first electrode tab extends from the lower surface of the electrode assembly to be welded to the bottom of the case, and
the second electrode tab extends from the upper surface of the electrode assembly to be welded to the tab bonding portion.

9. The button cell of claim 8, wherein
the terminal hole is at a center of the cap plate,
the center pin protrudes from the upper surface of the electrode assembly toward the tab bonding portion, and
the second electrode tab is supported by an upper end of the center pin and welded to the tab bonding portion.

10. The button cell of claim 1, wherein the cap plate is welded to a side wall end where a rim surrounds the opening of the case.

11. The button cell of claim 1, wherein a ratio of a height of the button cell along the first direction to a diameter of the button cell is 1 or less.

* * * * *